Aug. 26, 1941.  J. BEIER  2,253,750

FRICTION GEARING

Filed July 27, 1939  2 Sheets-Sheet 1

INVENTOR
JOSEF BEIER.
BY
ATTORNEY

Aug. 26, 1941.    J. BEIER    2,253,750
FRICTION GEARING
Filed July 27, 1939    2 Sheets-Sheet 2

INVENTOR
JOSEF BEIER.
Karl A. Mayr.
BY    ATTORNEY

Patented Aug. 26, 1941

2,253,750

UNITED STATES PATENT OFFICE 2,253,750

FRICTION GEARING

Josef Beier, Mannheim-Feudenheim, Germany

Application July 27, 1939, Serial No. 286,794
In Germany July 28, 1938

8 Claims. (Cl. 74—190.5)

The present invention relates to a friction gear transmission in which the gear ratio is automatically changed in dependence on the moment transmitted by the transmission.

Friction gear transmissions are known in the art in which a friction member is arranged in the bracket or link member of a rotating gear. In gears of this type the pressure between the teeth of the sun wheel and the planet wheel presses the bracket of the rotating gear and the friction member arranged thereon against another friction member at a pressure which is greater in proportion to the transmitted moment. The pressure necessary for power transmission is thereby automatically adapted to the load. The transmission ratio, however, is not changed with such conventional friction gearing.

It is an object of the present invention to provide a friction drive in which the gear ratio is automatically changed in dependence on the friction pressure.

Further and other objects and advantages of the present invention will be apparent from the accompanying specification and claims and shown in the drawings which, by way of illustration, show what I now consider to be preferred embodiments of my invention.

In the drawings.

Like parts are designated by like letters in all figures of the drawings.

Figure 1:
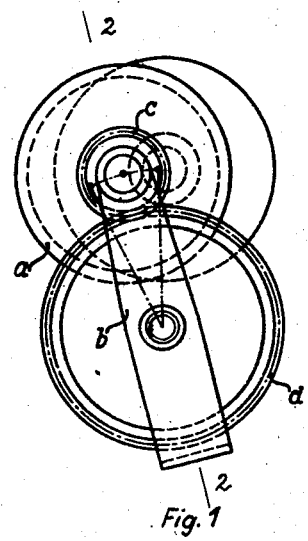
Figure 1 is a diagrammatic side view of a gearing according to the present invention.
Figure 2:
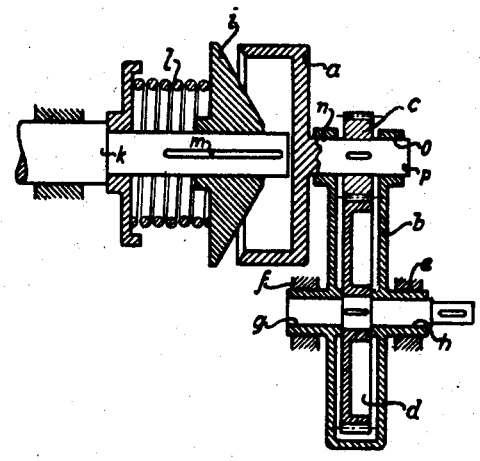
Figure 2 is a diagrammatic sectional view along line 2—2 of the gearing shown in Figure 1.
Figure 3:
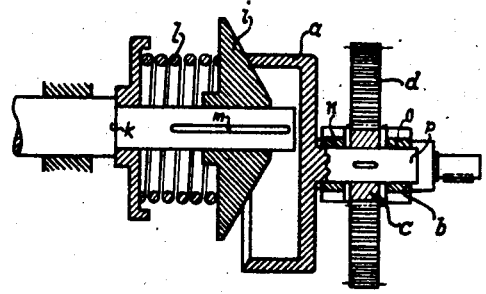
Figure 3 is a diagrammatic part sectional view of the gearing shown in Figures 1 and 2 and showing the friction members in frictional engagement.

According to Figures 1 to 3 a friction member $a$ is rotatably supported by the bracket $b$ of a revolving gear which comprises, besides the bracket $b$ the planet gear $c$ and the sun wheel $d$. Bracket or link member $b$ rests in bearings $e$ and $f$ and the sun wheel $d$ in the bearings $g$ and $h$ of the bracket $b$.

A counter friction member $i$ is axially displaceably connected with a shaft $k$ and is pressed against member $a$ by a spring $l$ which produces the necessary friction pressure. The torque is transmitted from friction wheel $i$ to shaft $k$ by means of the key $m$.

If the driving or driven torque increases, the pressure between gear wheels $c$ and $d$ increases. This causes a reaction force in the bearings $n$ and $o$ which is as great as and acts in a direction opposite to that of the tooth pressure and tends to turn bracket $b$ about bearing $e$, $f$ with increased force and presses thereby the friction member $a$ with increased pressure onto friction member $i$. The latter yields to the increased pressure and compresses the resilient means $l$. Due to the conic configuration and the axial displacement of member $i$ the point of engagement of friction members $a$ and $i$ moves further towards the shaft $k$ whereby the gear ratio is automatically changed. Spring means $l$ may be so adjusted that at a change of the gear ratio to, say, twice the original ratio the power of the spring is also duplicated. Any other relationship between change of gear ratio and of spring power may be arranged. Instead of the metal spring shown in the drawings pneumatic spring means comprising a cylinder and a piston therein may be used. Any other force acting in axial direction may be employed as resilient means, for example, the centrifugal force of a rotating weight whereby said force is brought into axial direction by suitable means which are well known. The action of the spring means may be influenced in known manner for example by means of magnets, hydraulic elements, etc., which may be operated from a distant point so that the gear ratio can be changed at will or it can be made dependent on suitable operating conditions, for example, in the case of a pump drive, for example, on the amount of fluid.

Figure 4:
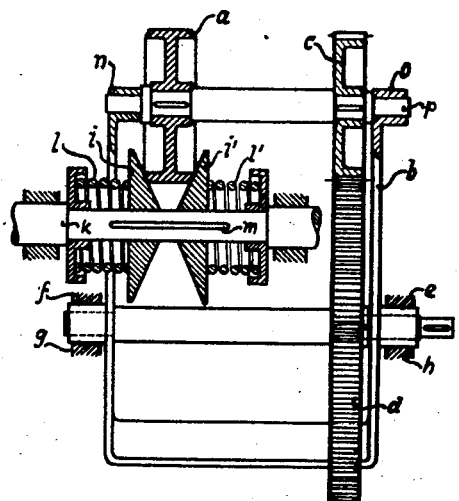
Figure 4 is a part sectional diagrammatic view of a modified gearing according to the present invention.

In order to avoid the axial loads connected with an arrangement as per Figures 1 to 3, a mechanism is suggested as per Figure 4 in which the axial forces are counterbalanced. Instead of one counter friction member $i$ two such members $i$ and $i'$ are provided which are pressed by the spring means $l$ and $l'$ respectively against the friction member $a$ which is revolvably supported in the bearings $n$ and $o$ of the bracket member $b$. With the arrangement as per Figure 4 the number of points of frictional engagement is duplicated.

Figure 5:
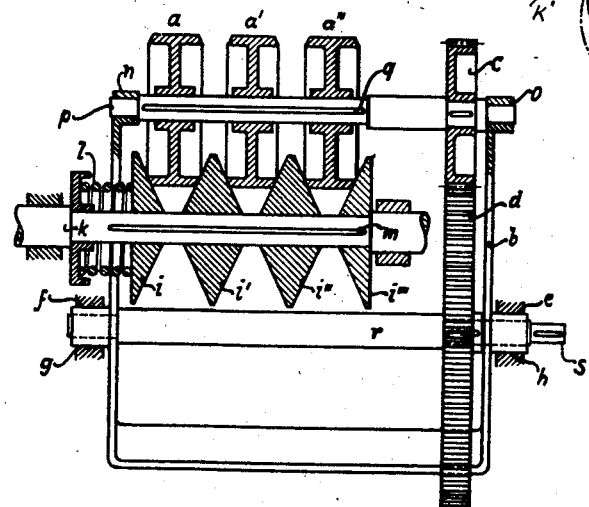
Figure 5 is a part sectional diagrammatic view of another modification of a gearing according to the present invention.

In Figure 5 of the drawings an arrangement according to the present invention is shown by means of which the frictionally engaging areas are further multiplied. The friction member shaft $p$ carries a plurality, for example, three friction members $a$, $a'$ and $a''$ which are axially displaceable on the shaft $p$ and are pressed in between the conic surfaces of the counter friction members $i$, $i'$, $i''$ and $i'''$ and thereby tend to separate said counter friction members against the action of the spring means $l$. The friction wheel members $a$ to $a''$ transmit their torque through the key $q$ to the shaft of the planet wheel $c$ which rests in bearings $n$ and $o$ provided in the bracket member $b$; the latter turns in the stationary bearings $e$ and $f$ according to the pressure between wheels $c$ and $d$ and presses thereby the friction bodies $a$, $a'$ and $a''$ more or less between the counter friction members $i$, $i'$, $i''$ and $i'''$ according to the extent of turning motion of said bracket member whereby the gear ratio is automatically changed. The wheel $d$ which is rotatable in bearings $g$ and $h$ provided in the bracket member $b$ transmits the torque through shaft $r$ to pin $s$.

In order to multiply the capacity of a transmission according to the present invention a plurality, for example, three rows of friction members $a_1$, $a_2$, and $a_3$ may be so arranged in the bracket members $b_1$, $b_2$ and $b_3$ respectively of a plurality of rotating gear transmissions that they all reach in between and frictionally engage a common row of counter friction members $i$ which are axially displaceably filled on a shaft $k$ and axially pressed towards one another by suitable spring means. If, for example, the center shaft $k$ and thereby, through key $m$, the friction members $i$ are rotated in the direction of the arrow $k'$ tooth pressures acting in the direction of arrows Z are produced between the planet wheels $c_1$, $c_2$ and $c_3$ and the sun wheels $d_1$, $d_2$ and $d_3$ respectively, which pressures produce the reaction forces indicated by arrows Z' which forces tend to turn the bracket members $b_1$, $b_2$ and $b_3$ about their stationary bearings and thereby force the friction members $a_1$, $a_2$ and $a_3$ in between the counter pressure members $i$ to an extent which depends on the pressures Z whereby the gear ratio is accordingly and automatically changed.

Figure 6:
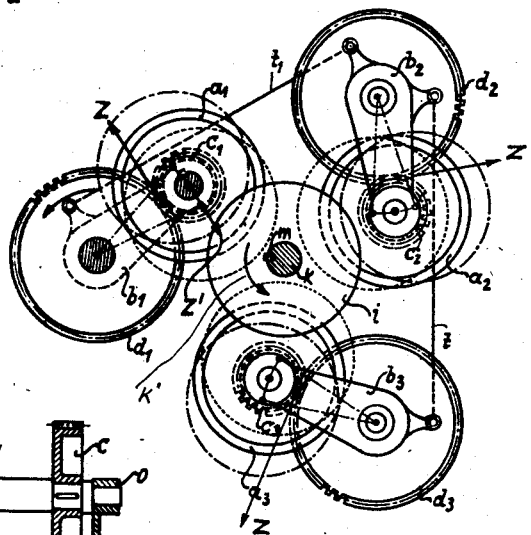
Figure 6 is a diagrammatic side view of a further modification of a gearing according to the present invention.

The dotted lines in Figure 6 show the position of the friction members $a$ when the gear ratio is greatest and the dash and dotted lines the position of members $a$ when the gear ratio is smallest. The bracket members $b_1$, $b_2$ and $b_3$ may be interconnected by means of a coupling, for example, the coupling rods $t_1$ and $t$ so that their turning motions are exactly of the same extent and the same gear ratio is produced between all friction and counter friction members.

While I believe the above described embodiments of my invention to be preferred embodiments, I wish it to be understood that I do not desire to be limited to the exact details of design and construction shown and described, for obvious modifications will occur to a person skilled in the art.

The automatically acting and gear ratio changing friction wheel transmission according to the present invention has the following advantages:

(1) At rapidly changing load as is for example connected with the operation of motor cars the gear ratio is quickly adapted to the changes in load, because the change of the gear ratio in dependence on the load is produced by proportionate and great forces.

(2) The number of engaging points and thereby the transmitted load can easily be multiplied by arranging a plurality of friction members on a common shaft.

I claim:

1. A friction gearing with, in dependence on the transmitted torque, automatically changing gear ratio, comprising a center gear wheel, a planet gear wheel cooperating with said center wheel, a link member rotatably holding both said wheels and being swingable about the axis of rotation of said center wheel, a pair of axially displaceable counter friction members rotatable about a stationary axis, a friction wheel member coaxially connected with said planet wheel and extending in between said counter friction members, resilient means axially displacing and pressing said counter friction members towards one another and to frictional engagement with the part of said friction wheel member thereinbetween, said friction members having substantially cone shaped frictional engaging surfaces and rotating about axes parallel to one another, the distance of the point of frictional engagement of said friction members from said stationary axis changing upon rotation of said link member.

2. A friction gearing with, in dependence on the transmitted torque, automatically changing gear ratio, comprising a center gear wheel, a planet gear wheel cooperating with said center wheel, a link member rotatably holding both said wheels and being swingable about the axis of rotation of said center wheel, a plurality of axially displaceable counter friction members rotatable about a stationary axis, a plurality of friction wheel members coaxially connected with said planet wheel and each of said friction wheel members extending in between pairs of said counter friction members, resilient means axially displacing and pressing said counter friction members towards one another and to frictional engagement with the part of said friction wheel members thereinbetween, said friction members having substantially cone shaped frictional engaging surfaces and rotating about axes parallel to one another, the distance of the point of frictional engagement of said friction members from said stationary axis changing upon rotation of said link member.

3. A friction gearing with, in dependence on the transmitted torque, automatically changing gear ratio, comprising a friction member rotatable about and axially displaceable on a stationary axis, a plurality of friction wheel members adapted to frictionally engage said first mentioned friction member, a gear wheel individually axially connected with each of said friction wheel members, other gear wheels individually cooperating with said first mentioned gear wheels, link members individually rotatably holding said cooperating gear wheels and being individually rotatable about the axes of rotation of said other wheels, said friction members having substantially cone shaped frictional engaging surfaces and rotating about axes parallel to one another, the distance of the point of frictional engagement of said friction members from said stationary axis changing upon rotation of said link members.

4. A friction gearing with, in dependence on the transmitted torque, automatically changing gear ratio, comprising a friction member rotatable about and axially displaceable on a stationary axis, a plurality of friction wheel members adapted to frictionally engage said first mentioned friction member, a gear wheel individually axially connected with each of said friction wheel members, other gear wheels individually cooperating with said first mentioned gear wheels, link members individually rotatably holding said cooperating gear wheels and being individually rotatable about the axes of rotation of said other wheels, said friction members having substantially cone shaped frictional engaging surfaces and rotating about axes parallel to one another, the distance of the point of frictional engagement of said friction members from said stationary axis changing upon rotation of said link members, and coupling means interconnecting said link members and assuring equal rotational motion thereof.

5. A friction gearing with, in dependence on the transmitted torque, automatically changing gear ratio, comprising, in combination, a plurality of central friction members rotatable about and coaxial and axially displaceable with respect to a stationary axis, a plurality of shaft members disposed immovably, equidistantly and symmetrically around said central friction members, a counterfriction member carrier individually swingably connected with each of said shaft members, a plurality of coaxially disposed and rotatable counterfriction members connected with each of said carriers and extending individually between and frictionally engaging said central friction members, and cooperating power transmitting means individually connected with said carriers and counterfriction members connected therewith and with said shaft members for transmitting rotary power from said counterfriction members to said shaft members.

6. A friction gearing with, in dependence on the transmitted torque, automatically changing gear ratio, comprising, in combination, a plurality of central friction members rotatable about and disposed coaxially and axially displaceable with respect to a stationary axis and having substantially cone shaped engaging surfaces, a plurality of rotatable members individually rotating about axes disposed immovably and equidistantly around and parallel to the axis of said central friction members, a plurality of counterfriction member carriers individually swingable about the axes of rotation of said rotatable members, a plurality of coaxially disposed and rotatable counterfriction members connected with each of said carriers and extending individually between and frictionally engaging said central friction members, resilient means resiliently axially pressing said central friction members together and onto said counterfriction members, and power transmitting means individually connected with said carriers and with said rotatable members for transmitting rotary power from said carriers to said rotatable members.

7. A friction gearing with, in dependence on the transmitted torque, automatically changing gear ratio, comprising, in combination, a plurality of central friction members rotatable about and disposed coaxially and axially displaceable with respect to a stationary axis and having substantially cone shaped engaging surfaces, a plurality of rotatable members individually rotating about axes disposed immovably and equidistantly around and parallel to the axis of said central friction members, a plurality of counterfriction member carriers, carrier support means individually swingable about the axes of rotation of said rotatable members and individually supporting said carriers, a plurality of coaxially disposed and rotatable counterfriction members connected with each of said carriers and extending individually between and frictionally engaging said central friction members, resilient means resiliently axially pressing said central friction members together and onto said counterfriction members, power transmitting means individually connected with said carriers and with said rotatable members for transmitting rotary power from said carriers to said rotatable members, and connecting means interconnecting said carrier support means and assuring simultaneous and equal swinging motion thereof.

8. A friction gearing with, in dependence on the transmitted torque, automatically changing gear ratio, comprising, in combination, a plurality of central friction members rotating about a central axis of rotation and being axially displaceable, a plurality of shaft members disposed around said central friction members, a plurality of counterfriction member carriers individually swingably connected with each of said shaft members, a plurality of rows of counterfriction members axially displaceably disposed on a plurality of shafts rotatably supported by said carriers, said counterfriction members extending individually between and frictionally engaging said central friction members, and cooperating power transmitting means individually connected with said carriers and counterfriction members and with said shaft members for transmitting rotary power from said rows of counterfriction members to said shaft members and from said shaft members to said rows of counterfriction members.

JOSEF BEIER.